(12) United States Patent
Takagi et al.

(10) Patent No.: US 11,891,018 B2
(45) Date of Patent: Feb. 6, 2024

(54) STORAGE COMPARTMENTS HAVING INERTIA FORCE CLOSURE MECHANISMS, CONSOLE ASSEMBLIES, AND VEHICLES INCORPORATING THE SAME

(71) Applicant: Toyoda Gosei Co., Ltd., Kiyosu (JP)

(72) Inventors: Hironori Takagi, Troy, MI (US); Aaron Klenke, Troy, MI (US)

(73) Assignee: TOYODA GOSEI CO., LTD., Kiyosu (JP)

( * ) Notice: Subject to any disclaimer, the term of this patent is extended or adjusted under 35 U.S.C. 154(b) by 280 days.

(21) Appl. No.: 17/224,408

(22) Filed: Apr. 7, 2021

(65) Prior Publication Data

US 2022/0325566 A1 Oct. 13, 2022

(51) Int. Cl.
*E05B 83/32* (2014.01)
*B60R 7/04* (2006.01)

(52) U.S. Cl.
CPC ............... *B60R 7/04* (2013.01); *E05B 83/32* (2013.01)

(58) Field of Classification Search
CPC .................................. E05B 83/32; B60R 7/04
USPC .......................... 296/37.8, 24.34, 1.09, 153
See application file for complete search history.

(56) References Cited

U.S. PATENT DOCUMENTS

| | | | |
|---|---|---|---|
| 5,520,313 A * | 5/1996 | Toshihide ............... | B60N 3/102 224/280 |
| 6,802,550 B1 * | 10/2004 | Griggs, Jr. .............. | E05B 83/32 292/136 |
| 7,607,727 B2 * | 10/2009 | Park ........................ | E05B 77/04 292/231 |
| 9,561,753 B1 * | 2/2017 | Mendoza Vera .......... | B60R 7/04 |
| 10,352,076 B2 * | 7/2019 | Selvakumar ........... | B60N 2/793 |
| 10,434,907 B2 * | 10/2019 | Deeken ................... | B60N 2/753 |
| 11,161,441 B2 * | 11/2021 | Chen ........................ | B60N 2/78 |
| 2009/0174236 A1 * | 7/2009 | Lota ......................... | B60R 7/04 297/188.19 |
| 2009/0218842 A1 * | 9/2009 | Muller .................... | E05B 83/32 296/37.13 |
| 2013/0153717 A1 * | 6/2013 | Cinco ...................... | B60N 2/78 248/118 |
| 2016/0052428 A1 * | 2/2016 | Hessdörfer ............ | B60N 2/753 297/411.32 |
| 2017/0074005 A1 * | 3/2017 | Amick ..................... | E05B 85/22 |
| 2018/0162282 A1 * | 6/2018 | Anderson ................ | B60R 7/04 |
| 2018/0304790 A1 | 10/2018 | Patil et al. | |
| 2018/0371808 A1 * | 12/2018 | Yano ....................... | E05B 83/32 |
| 2020/0130550 A1 * | 4/2020 | Stewart .................... | B60N 2/78 |

(Continued)

FOREIGN PATENT DOCUMENTS

DE  102017119876 A1 *  2/2019  ............ E05B 77/06

*Primary Examiner* — Jason S Daniels
(74) *Attorney, Agent, or Firm* — Dinsmore & Shohl LLP (57) ABSTRACT

A storage compartment includes a housing, a lid, a locking mechanism, and a closure mechanism. The lid is pivotally coupled to the housing about a pivot axis for movement between a closed position and an opened position. The locking mechanism is displaceable in a first direction to move between an unlocked position and a locked position, the first direction extending generally normal to the pivot axis. The closure mechanism is configured to inhibit movement of the lid from the closed position towards the opened position upon movement of the locking mechanism to the unlocked position due to movement of the housing in the first direction with respect to the lid.

20 Claims, 4 Drawing Sheets

(56) References Cited

U.S. PATENT DOCUMENTS

2020/0173217 A1* 6/2020 Hodgson .................. E05F 1/16
2020/0408005 A1* 12/2020 Santillan gutierrez ... B60R 7/04

* cited by examiner

STORAGE COMPARTMENTS HAVING INERTIA FORCE CLOSURE MECHANISMS, CONSOLE ASSEMBLIES, AND VEHICLES INCORPORATING THE SAME

TECHNICAL FIELD

The present specification generally relates to storage compartments for console assemblies of vehicles and, more specifically, to storage compartments having inertia force closure mechanisms to inhibit movement of lids from closed positions to opened positions upon disengagement of locking mechanisms during a rear collision.

BACKGROUND

It has been known to provide passenger compartments of vehicles with console assemblies having storage compartments that include a lid pivotally coupled to a housing and a locking mechanism that is displaceable to move between an unlocked position and a locked position. In the locked position, the locking mechanism inhibits movement of the lid from a closed position to an opened position. In the unlocked position, the locking mechanism permits movement of the lid from the closed position to the opened position. However, in situations in which the vehicle is involved in a rear collision, the housing may move in the forward direction with respect to the lid. The movement of the housing, with respect to the lid, in the forward direction may also displace the locking mechanism in the forward direction thereby moving the locking mechanism from the locked position to the unlocked position. As such, consumer satisfaction may be decreased due to the lid of the storage compartment being able to move from the closed position to the opened position during the rear collision.

Accordingly, there is a need for storage compart assemblies, console assemblies, and vehicles that provides an inertia force closure mechanism that inhibits movement of the lid from the closed position to an opened position when the locking mechanism is moved from the locked position to the unlocked position due to the movement of a housing of the storage compartment during a rear collision.

SUMMARY

In accordance with one embodiment, a storage compartment is provided. The storage compartment includes a housing, a lid, a locking mechanism, and a closure mechanism. The lid is pivotally coupled to the housing about a pivot axis for movement between a closed position and an opened position. The locking mechanism is displaceable in a first direction to move between an unlocked position and a locked position, the first direction extending generally normal to the pivot axis. The closure mechanism is configured to inhibit movement of the lid from the closed position towards the opened position upon movement of the locking mechanism to the unlocked position due to movement of the housing in the first direction with respect to the lid.

In accordance with another embodiment, a console assembly for a vehicle is provided. The console assembly includes a housing, a lid, a locking mechanism, and a closure mechanism. The lid is pivotally coupled to the housing about a pivot axis for movement between a closed position and an opened position. The locking mechanism is displaceable in a vehicle longitudinal direction to move between an unlocked position and a locked position, the vehicle longitudinal direction extending generally normal to the pivot axis. The closure mechanism is configured to inhibit movement of the lid from the closed position towards the opened position upon movement of the locking mechanism to the unlocked position due to movement of the housing in a first direction with respect to the lid. The first direction extending parallel with the vehicle longitudinal direction.

In accordance with another embodiment, a vehicle is provided. The vehicle includes a passenger compartment and a storage compartment provided within the passenger compartment. The storage compartment includes a housing, a lid, a locking mechanism, and a closure mechanism. The lid is pivotally coupled to the housing about a pivot axis for movement between a closed position and an opened position. The locking mechanism is displaceable in a vehicle longitudinal direction to move between an unlocked position and a locked position, the vehicle longitudinal direction extending generally normal to the pivot axis. The closure mechanism is configured to inhibit movement of the lid from the closed position towards the opened position upon movement of the locking mechanism to the unlocked position due to movement of the housing in a first direction with respect to the lid. The first direction extending parallel with the vehicle longitudinal direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Vehicles according to the present specification include a passenger compartment having an instrument panel and at least two seats, such as a driver seat and a front passenger seat. Between the driver seat and the front passenger seat, and rearward of the instrument panel is a console assembly. The console assembly extends rearward from the instrument panel in a vehicle longitudinal direction. The console assembly may be mounted in-between the driver seat and the front passenger seat, and immediately rearward of the instrument panel so that a portion the console assembly may be incorporated with the instrument panel.

The console assembly includes a storage compartment. The storage compartment includes a housing, a lid, a locking mechanism, and an inertia force closure mechanism. The lid is pivotally coupled to the housing about a pivot axis for movement between a closed position and an opened position. The locking mechanism is displaceable in a vehicle longitudinal direction to move between an unlocked position and a locked position, the vehicle longitudinal direction extending generally normal to the pivot axis.

During a rear collision, the housing may move in a first direction, with respect to the lid. The first direction extending generally parallel to the vehicle longitudinal direction such that movement of the housing in the first direction moves the locking mechanism from the locked position to the unlocked position. In order to inhibit the movement of the lid from the closed position to the opened position during the rear collision, the closure mechanism is provided. The closure mechanism is configured to inhibit movement of the lid from the closed position towards the opened position upon movement of the locking mechanism to the unlocked position due to movement of the housing in the first direction with respect to the lid.

Various embodiments of the storage compartment of a console assembly for the vehicle will be described in more detail herein.

As used herein, the term "vehicle longitudinal direction" refers to the forward-rearward direction of the vehicle (i.e., in the +/− vehicle X-direction as depicted). The term "vehicle lateral direction" refers to the cross-vehicle direction of the vehicle (i.e., in the +/− vehicle Z-direction as depicted), and is transverse to the vehicle longitudinal direction. The term "vehicle vertical direction" refers to the upward-downward direction of the vehicle (i.e., in the +/− vehicle Y-direction as depicted). As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a vehicle centerline. The term "inboard" as used herein refers to the relative location of a component with respect to the vehicle centerline. Because the vehicle structures may be generally symmetrical about the vehicle centerline, the direction to which use of terms "inboard" or "outboard" and refer may be mirrored about the vehicle centerline when evaluating components positioned along opposite sides.

Figure 1:
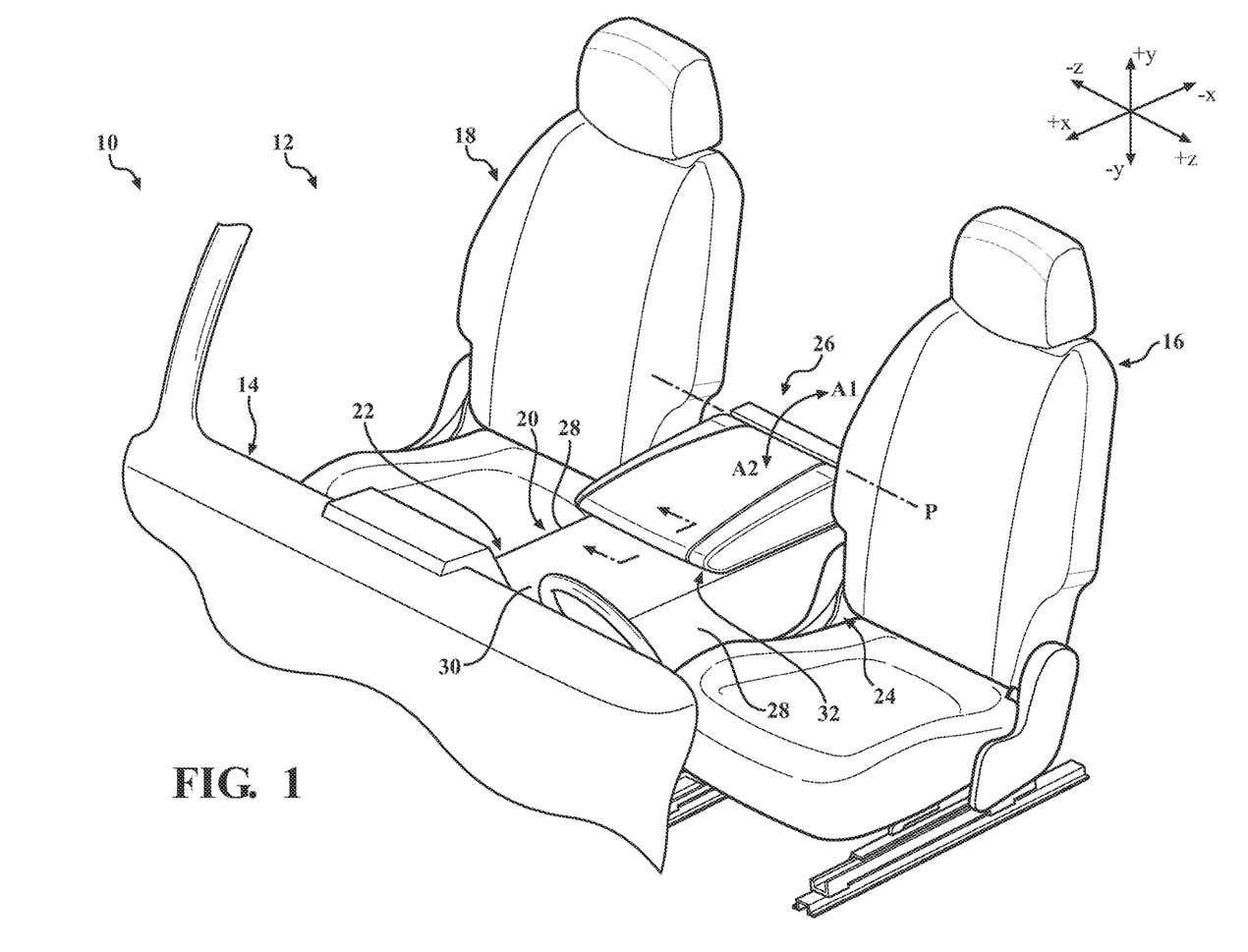
FIG. 1 schematically depicts a partial perspective view of a passenger compartment of a vehicle having a console assembly and a storage compartment in a closed state, according to one or more embodiments described and illustrated herein.

Referring initially to FIG. 1, a partial perspective view of a passenger compartment 12 of a vehicle 10 is depicted. An instrument panel 14 is provided within the passenger compartment 12. The passenger compartment 12 includes a driver seat 16 and a front passenger seat 18.

The instrument panel 14 generally extends in the vehicle lateral direction and includes, without limitation, an instrument cluster, a radio, and a climate control cluster including a plurality of individual vents. Located forward of the driver seat 16 are the vehicle driving controls such as, without limitation, a steering wheel, a gas pedal, and a brake pedal.

In some embodiments, the vehicle 10 is an autonomous vehicle in which no vehicle driving controls are provided. In such an embodiment, the passenger compartment 12 includes another front passenger seat 18 in place of the driver seat 16. It should be appreciated that the passenger compartment 12 may include a plurality of passenger seats rearward of the driver seat 16 and the front passenger seat 18 in the vehicle longitudinal direction.

A console assembly 20 is generally provided between the driver seat 16 and the front passenger seat 18 in the vehicle lateral direction. The console assembly 20 generally extends in the vehicle longitudinal direction extending from the instrument panel 14 ending at or slightly beyond a rear surface of the driver seat 16 and the front passenger seat 18. Further, the console assembly 20 generally extends in the vehicle lateral direction an equal distance outwardly from a vehicle centerline, limited in width by the distance between the driver seat 16 and the front passenger seat 18. The console assembly 20 includes a forward portion 22 and a rearward portion 24. The forward portion 22 being closer to the instrument panel 14 than the rearward portion 24. In some embodiment, the forward portion 22 is coupled to the instrument panel 14.

Disposed within the rearward portion 24 of the console assembly 20 is a storage compartment 26. The storage compartment 26 may be integrated with the console assembly 20. In some embodiments, the storage compartment 26 is integrated with the console assembly 20 and the instrument panel 14. In some other embodiments, the storage compartment 26 may be separated from the console assembly 20, the instrument panel 14, or both.

The console assembly 20 may also include a pair of side panels 28 and a console panel 30. The console panel 30 extends between the storage compartment 26 and the instrument panel 14. The pair of side panels 28 are provided on either side of the console assembly 20 in the vehicle lateral direction. Each of the pair of side panels 28 extends from the forward portion 22 to the rearward portion 24.

Figure 2:
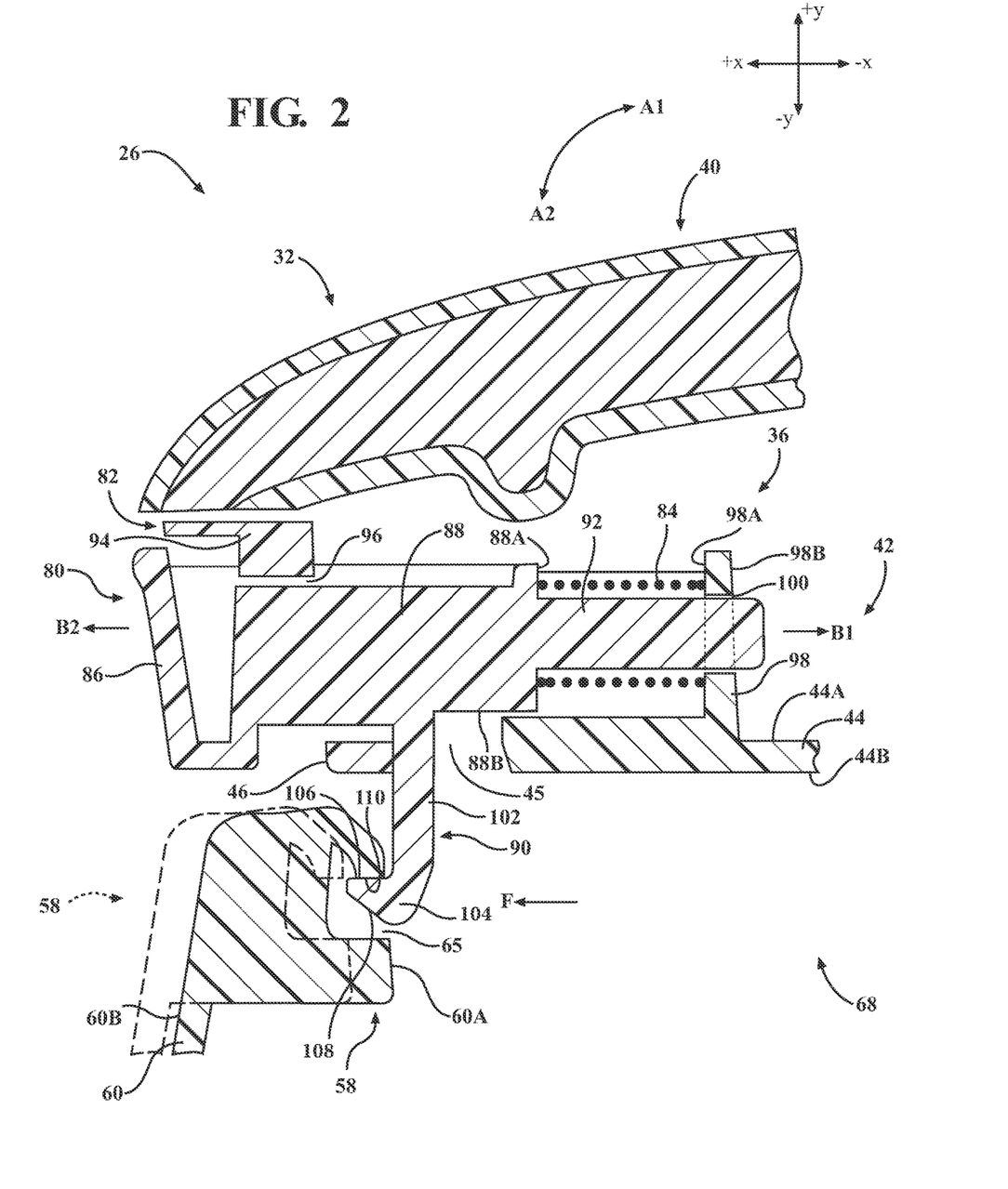
FIG. 2 schematically depicts a partial cross sectional view of the storage compartment taken along the line II-II of FIG. 1 in which a locking mechanism is in a locked state, according to one or more embodiments described and illustrated herein.
Figure 3:
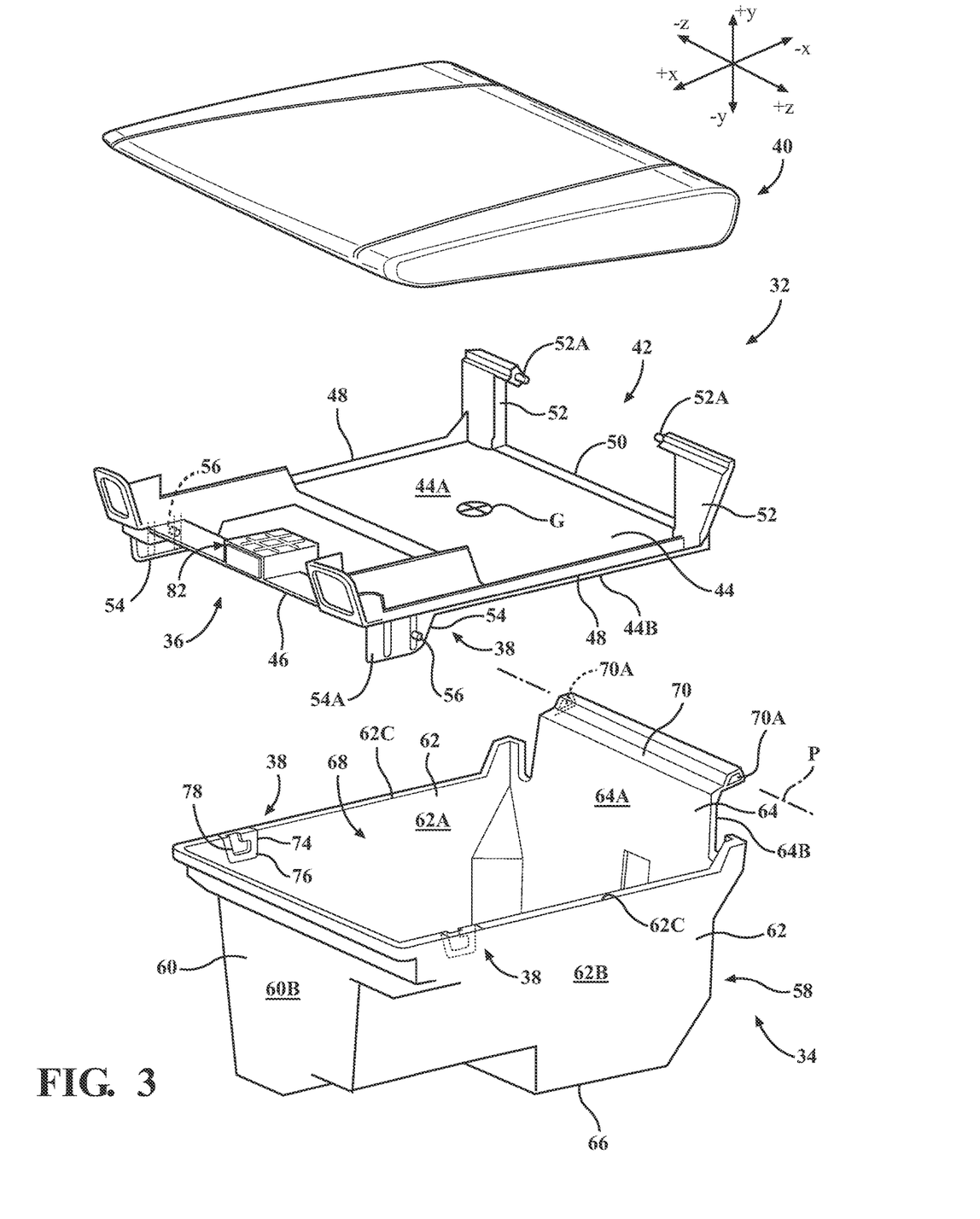
FIG. 3 schematically depicts an exploded view of the storage compartment, of FIG. 1, having a lid, a housing, an inertia force closure mechanism, and the locking mechanism, according to one or more embodiments described and illustrated herein.

Referring to FIGS. 1-3, the storage compartment 26 includes a lid 32, a housing 34, a locking mechanism 36, and an inertia force closure mechanism 38. The lid 32 is pivotally mounted to the housing 34 about a pivot axis P. The lid 32 is pivotal about the pivot axis P between a closed position and an opened position. As shown in FIG. 1, the lid 32 is in the closed position. As shown in FIG. 1, the lid 32 is pivotal about the pivot axis P in direction of arrow A1 to move from the closed position to the opened position, and the lid 32 is pivotal about the pivot axis P in the direction of arrow A2 to move from the opened position to the closed position.

Referring to FIG. 3, the lid 32 includes a lid cover 40 and a lid frame 42. The lid frame 42 includes a main frame 44. The main frame 44 includes an upper surface 44A, an opposite lower surface 44B, a front edge 46, a pair of side edges 48, and a rear edge 50. The lid frame 42 may also include a pair of attachment arms 52 extend generally upwardly from the upper surface 44A adjacent the rear edge 50. Each of the pair of attachment arms 52 includes an inwardly extending pin 52A.

As will be described in greater detail below, the locking mechanism 36 is mounted to the main frame 44 of the lid frame 42 and engages with the housing 34. The lid frame 42 may also include a pair of downwardly extending flanges 54. The flanges 54 extend downwardly from the lower surface 44B of the main frame 44 so as to extend below the side edges 48. As will be described in greater detail below, the closure mechanism 38 includes a protrusion 56 that extends outwardly from an exterior surface 54A of each of the pair of flanges 54 of the lid frame 42. In the illustrated embodiment, the protrusion 56 has a generally cylindrical shape. However, the shape of the protrusion 56 is not limited to a generally circular-sectional shape. It is appreciated, that the protrusion 56 may have a semicircular, rectangular, triangular, oblong, regular, or irregular cross-sectional shape.

The lid cover 40 is mounted to the main frame 44 of the lid frame 42. The lid cover 40 provides an aesthetically pleasing appearance to an outer surface of the lid 32. In the closed position, the lid 32 may act as an armrest for a user.

Still referring to FIG. 3, the housing 34 includes a housing body 58 having a front wall 60, a pair of side walls 62, a rear wall 64, and a bottom wall 66. The pair of side walls 62 extend between the front wall 60 and the rear wall 64. The front wall 60 includes an interior surface 60A and an opposite exterior surface 60B. Each of the pair of side walls 62 includes an inner surface 62A, opposite outer wall 62B, and a top surface 62C. The rear wall 64 includes an interior surface 64A and an opposite exterior surface 64B. The housing body 58 includes a bottom wall 66. The housing body 58 defines a storage area 68, specifically, the interior surface 60A of the front wall 60, the inner surfaces 62A of the side walls 62, the interior surface 64A of the rear wall 64, and the bottom wall 66 defines the storage area 68. In the closed position, the lid 32 inhibits access to the storage area 68. In the opened position, the lid 32 permits access to the storage area 68.

The housing body 58 may also include a mounting portion 70 that extends upwardly from the rear wall 64 beyond the top surface 62C of the side walls 62. The mounting portion 70 includes a pair of openings 70A. The pins 52A of the attachment arms 52 of the main frame 44 are configured to be at least partially receiving within the pair of openings 70A to pivotally couple the lid 32, through the lid frame 42, to the housing 34 about the pivot axis P. The connection and engagement of the pins 52A and the openings 70A permits the lid 32 to pivot about the pivot axis P between the closed position and the opened position.

Each of the pair of side walls 62 includes a cutout 74 that is recessed with respect to the inner surface 62A of the side walls 62. The cutouts 74 are open at the top surface 62C of the side walls 62. The closure mechanism 38 includes an insert 76 that is received and fixed within the cutouts 74 formed in each of the pair of side walls 62. The inserts 76 include a shaped groove 78. As will be discussed in greater detail below, the shaped groove 78 is configured to receive and engage with the protrusions 56 to inhibit movement of the lid 32 from the closed position to the opened position when the locking mechanism 36 is moved from the locked position to the unlocked position during a rear collision.

It is appreciated that the closure mechanism 38 may be formed without the cutout 74 and the insert 76 and that the shaped groove 78 may be formed directly within each of the pair of side walls 62. In such an embodiment, the shaped groove 78 is formed within the side walls 62 such that the shaped groove 78 is recessed with respect to the inner surface 62A of the side walls 62.

As shown in FIG. 3, the closure mechanism 38 is provided on both lateral sides of the storage compartment 26, specifically, the protrusion 56 is provided on each of the flanges 54 and the shaped groove 78 is provided on or in each of the pair of side walls 62. It is appreciated, that the storage compartment 26 may include only a single closure mechanism 38 provided on one the flanges 54 and the corresponding one of the pair of side walls 62.

Referring to FIG. 3, the closure mechanism 38 is provided forward of a center of gravity G of the lid 32. Although the center of gravity G of the lid 32 is represented on the lid frame 42, the center of gravity G is a center of gravity of the lid 32 including the lid cover 40 and the lid frame 42. Specifically, the protrusions 56 are located between the center of gravity G and the front edge 46 in the vehicle longitudinal direction. The shaped grooves 78 are located between the center of gravity G and the front wall 60 in the vehicle longitudinal direction when the lid 32 is in the closed position.

In some embodiments, the closure mechanism 38, specifically, the protrusions 56 and the shaped grooves 78, are positioned in a front half of the lid 32, in the vehicle longitudinal direction, when the lid 32 is in the closed position such that the closure mechanism 38 is positioned closer to the front edge 46 of the lid frame 42 of the lid 32 than the rear edge 50 of the lid frame 42 of the lid 32. In some embodiments, the closure mechanism 38, specifically, the protrusions 56 and the shaped grooves 78, are positioned closer to the front edge 46 of the lid frame 42 of the lid 32 than a center point of the lid frame 42, in the vehicle longitudinal direction, between the front edge 46 and the rear edge 50.

Referring to FIG. 2, the locking mechanism 36 will be discussed in greater detail. The locking mechanism 36 includes a release actuator 80, a mounting bracket 82, and a biasing member 84. The release actuator 80 includes an input portion 86, a base portion 88, a hook 90, and a shaft 92. The input portion 86 is the forward most portion of the release actuator 80 and the input portion 86 is configured to be actuated by a user. The base portion 88 includes a rear surface 88A and a bottom surface 88B. The hook 90 extends generally downwardly from the bottom surface 88B of the base portion 88. The shaft 92 extends rearward from the rear surface 88A of the base portion 88. The release actuator 80 is The mounting bracket 82 includes a front bracket 94 and a rear bracket 98. The front bracket 94 is provided adjacent the front edge 46 of the main frame 44. The front bracket 94 extends upwardly from the upper surface 44A of the main frame 44. The front bracket 94 defines a front opening 96. The rear bracket 98 extends upwardly from the upper surface 44A of the main frame 44 rearward of the front bracket 94. The rear bracket 98 includes a front surface 98A, an opposite rear surface 98B, and a bore 100 that extends between the front surface 98A and the rear surface 98B. The release actuator 80 is slidably coupled to the main frame 44 through the mounting bracket 82 such that the release actuator 80 is linearly displaceable in the vehicle longitudinal direction. Specifically, the release actuator 80, and consequently the locking mechanism 36, is linearly displaceable rearward in the direction of arrow B1 and forward in the direction of arrow B2.

The direction of arrow B1 is a rearward direction in the vehicle longitudinal direction. The direction of arrow B2 is a forward direction in the vehicle longitudinal direction. As described in greater detail below, the locking mechanism is linearly displaceable in the vehicle longitudinal direction to move between the locked position and the unlocked position. The rearward and frontward vehicle longitudinal direction corresponds to a first direction. Specifically, the direction of arrows B1 and B2 are rearward and forward vehicle longitudinal directions and correspond to the first direction. The direction of arrows B1 and B2 are generally normal to the pivot axis P.

The hook 90 includes an elongated extension 102 and an engagement portion 104. The elongated extension 102 extends generally downward, in the vehicle vertical direction, from the bottom surface 88B of the base portion 88. The elongated extension 102 extends through an aperture 45 formed in the main frame 44. The aperture 45 extends between the upper surface 44A and the lower surface 44B of the main frame 44. The engagement portion 104 extends forwardly, in the vehicle longitudinal direction, from a lower end of the elongated extension 102. The engagement portion 104 includes a contact surface 106 and a tapered surface 108.

As will be described in greater detail below, the engagement portion 104 is configured to be at least partially received within an opening or recess 65 formed in the front wall 60 of the housing 34. The recess 65 is at least partially defined by an upper surface 110.

The biasing member 84 is positioned between the rear surface 88A of the base portion 88 and the front surface 98A of the rear bracket 98. The biasing member 84 is configured to bias the release actuator 80 forward in the vehicle longitudinal direction in the direction of arrow B2. In some embodiments, the biasing member 84 is a hollow compression spring that is provided coaxially with the shaft 92 so as to surround the shaft 92. The shaft 92 is at least partially received within the bore 100 so as to guide the release actuator 80 as the release actuator 80 is linearly displaced between an extended position in the direction of arrow B2 and a retracted position in the direction of arrow B1. The release actuator 80 is biased towards the extended position due to a biasing force exerted by the biasing member 84.

Still referring to FIG. 2, the locking mechanism 36 is moveable between the locked position and the unlocked position to releasable couple the lid 32 to the housing 34. The locking mechanism 36 is in the locked position in which movement of the lid 32 from the closed position towards the opened position in the direction of arrow A1 is inhibited. In the locked position, the release actuator 80 is in the extended position. In the extended position, the hook 90 of the release actuator 80 is in an engaged position with the recess 65. In the engaged position, the engagement portion 104 of the hook 90 is at least partially received within the recess 65 and the contact surface 106 contacts and abuts the upper surface 110. The engagement of the engagement portion 104 and the recess 65, specifically, the contact and abutment of the contact surface 106 and the upper surface 110 inhibits movement of the lid 32 from the closed position towards the opened position.

In order to move the locking mechanism 36 from the locked position to the unlocked position, the user actuates the release actuator 80 by pressing the input portion 86 rearward in the direction of arrow B1, with respect to the front bracket 94, so as to overcome the biasing force of the biasing member 84 and to linearly displace the release actuator 80 from the extended position to the retracted position. In the retracted position, a distance between the rear surface 88A of the base portion 88 and the front surface 98A of the rear bracket 98 is less than a distance between the rear surface 88A of the base portion 88 and the front surface 98A of the rear bracket 98 in the extended position.

The linear displacement of the release actuator 80 from the extended position to the retracted positon in the direction of arrow B1 consequently moves the hook 90 from the engaged position to a disengaged position. Specifically, the linear displacement of the release actuator 80 rearward in the direction of arrow B1 also moves the hook 90 rearward in the direction of arrow B1. In the disengaged position, the engagement portion 104 of the hook 90 is disengaged from the recess 65 such that the contact surface 106 is spaced apart from the upper surface 110. The disengagement of the engagement portion 104 and the recess 65, specifically, the lack of contact and abutment between the contact surface 106 and the upper surface 110 permits movement of the lid 32 from the closed position towards the opened position.

Figure 4:
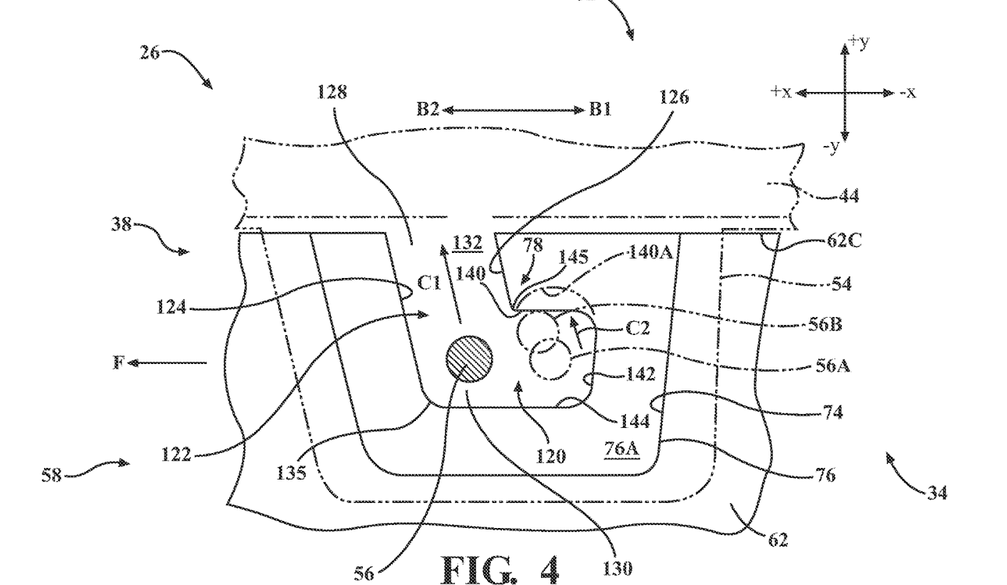
FIG. 4 schematically depicts a partial side view of the closure mechanism, according to one or more embodiments described and illustrated herein.

Referring to FIG. 4, the closure mechanism 38 will be discussed in greater detail. The closure mechanism 38 includes the protrusions 56 on the lid frame 42 and the shaped groove 78 on the housing 34. The shaped groove 78 is a channel recessed with respect to an exposed surface 76A of the insert 76. In some embodiments, when the shaped groove 78 is formed in the side wall 62, the shaped groove 78 is a channel recessed with respect to the inner surface 62A of the side wall 62. The shaped groove 78 has a generally hockey stick shape and includes a retaining groove 120 and a release groove 122. The retaining groove 120 corresponds to a first groove and the release groove 122 corresponds to a second groove.

The retaining groove 120 has a longitudinal axis that extends generally parallel with the vehicle longitudinal direction (i.e. the first direction). Specifically, the retaining groove 120 extends parallel to the direction of arrow B1 and, as such, the retaining groove 120 extends generally normal to the pivot axis P. The retaining groove 120 is in communication with the release groove 122.

The release groove 122 extends obliquely from the retaining groove 120. Specifically, the release groove 122 extends so as to be inclined in the forward direction of the vehicle longitudinal direction as the release groove 122 extends upwardly in the vehicle vertical direction. As such, an angle formed between a longitudinal axis of the release groove 122 and a longitudinal axis of the retaining groove 120 is an obtuse angle.

The release groove 122 includes a front side wall 124 and an opposite rear side wall 126. The release groove 122 includes a first end 128 that opens to the top surface 62C of the side wall 62 of the housing body 58 of the housing 34. As described in greater detail below, the release groove 122 includes a second end 130 that corresponds to a junction between the release groove 122 and the retaining groove 120. The front side wall 124 extends from the first end 128 at the top surface 62C of the side wall 62 to a lower junction 135. The rear side wall 126 extends from the first end 128 at the top surface 62C of the side wall 62 to an upper junction 145.

The retaining groove 120 includes an upper side wall 140, a rear end wall 142, and a bottom side wall 144. The upper side wall 140 extends from the upper junction 145 to an upper end of the rear end wall 142. The bottom side wall 144 extends from a lower end of the rear end wall 142 to the lower junction 135. The lower junction 135 is a junction between the front side wall 124 and the bottom side wall 144. The upper junction 145 is a junction between the rear side wall 126 and the upper side wall 140.

The junction between the release groove 122 and the retaining groove 120 is disposed at the second end 130 of the release groove 122. In some embodiments, the second end 130 is defined by an imaginary straight line that connects the lower junction 135 to the upper junction 145. In some other embodiments, the junction between the release groove 122 and the retaining groove 120 is defined by an imaginary straight line that extends downwardly in the vehicle vertical direction (i.e. −Y direction) from the upper junction 145 to the bottom side wall 144. As the release groove 122 and the retaining groove 120 are in communication with each other, the release groove 122 and the retaining groove 120 include an end wall 132 that extends from the first end 128 of the release groove 122 to the rear end wall 142 of the retaining groove 120.

As will be described in greater detail below, the protrusions 56 extend outwardly from the exterior surface 54A of the flanges 54 in the vehicle lateral direction. The protrusions 56 extends so as to be generally parallel with the pivot axis P and generally normal to the direction of arrow B1 (i.e. the first direction). The direction of extension of the protrusions 56 corresponds to a second direction. It is appreciated that the protrusion 56 is fixedly secured to the exterior surface 54A of the flange 54 such that the protrusion 56 is not movable with respect to the flange 54.

A width of the release groove 122 and a width of the retaining groove 120 is at least twice a diameter of the protrusion 56. Specifically, a diameter D of the protrusion 56 is at least 50% (±1%, ±5%, ±10%) of a distance D1 between the front side wall 124 and the rear side wall 126. The diameter D of the protrusion 56 is at least 50% (±1%, ±5%, ±10%) of a distance D2 between the upper side wall 140 and the bottom side wall 144.

The storage compartment 26 is movable between a locked state, an open state, and a retained state. In the locked state, the lid 32 is in the closed position, the locking mechanism 36 is in the locked position, the release actuator 80 is in the extended position, the hook 90 is in the engaged position, and the closure mechanism 38 is in a release position. In the release position, the protrusion 56 is received within the release groove 122 of the shaped groove 78, as shown in FIG. 4. In the release position, the protrusion 56 does not contact the shaped groove 78 and a distal end of the protrusion 56 is spaced apart from the end wall 132 of the shaped groove 78. In the locked state, the lid 32 is inhibited from pivoting from the closed position to the opened position due to the locking mechanism 36 and not by the closure mechanism 38.

In the open state, the lid 32 is the opened position, the locking mechanism 36 is in the unlocked positon, the release actuator 80 is in either the extended position or the retracted position, the hook 90 is in the disengaged position, and the closure mechanism 38 is in a separated position. In the separated position, the protrusion 56 is disengaged from the shaped groove 78 such that the protrusion 56 is spaced apart from the release groove 122 and the retaining groove 120 due to the opened position of the lid 32. In the open state, the lid 32 is permitted to pivot from the opened position towards the closed position.

In the retained state, the lid 32 is in the closed position, the locking mechanism 36 is in the unlocked position with the hook 90 in the disengaged position, and the closure mechanism 38 is in a retained position. In the retained position, the protrusion 56 is positioned within the retaining groove 120 and retained within the retaining groove 120 due the contact between the upper side wall 140 to inhibit movement of the lid 32 from the closed position towards the opened position. In the retained state, the lid 32 is inhibited from moving from the closed position towards the opened position by the closure mechanism 38 and not by the locking mechanism 36 as the locking mechanism 36 is moved into the unlocked position due to movement of the housing 34, with respect to the lid 32, in the direction of arrow F, as will be described in greater detail below.

In order to facilitate a better understanding of the closure mechanism 38, a discussion of the operation will be provided. Still referring to FIG. 4, the storage compartment 26 is initially in the closed state with the lid 32 in the closed position, the locking mechanism 36 in the locked position, and the closure mechanism 38 in the release position. From the closed state, the user may move the storage compartment 26 to the open state.

In order to move the storage compartment 26 from the closed state to the open state, the user actuates the locking mechanism 36 to move from the locked position to the unlocked position. Specifically, the user presses the input portion 86 of the release actuator 80 in the direction of arrow B1 so as to overcome the biasing force of the biasing member 84. The depression of the input portion 86 linearly displaces the release actuator 80 in the direction of arrow B1 to move from the extended position to the retracted position. The linearly displacement of the release actuator 80 from the extend position to the retracted position also displaces the hook 90 from the engaged position towards the disengaged position. Upon movement of the hook 90 from the engaged position to the disengaged position, the contact surface 106 no longer contacts the upper surface 110 and the locking mechanism 36 is in the unlocked position.

As shown in FIG. 4, the closure mechanism 38 is in the release position which permits the movement of the lid 32 from the closed position towards the opened position. Specifically, in the release position, the protrusion 56 is disposed within the release groove 122 such that pivoting the lid 32 about pivot axis P from the closed position towards the opened position in the direction of arrow A1 moves the protrusion 56 in the direction of arrow C1 so as to exit the first end 128 at the top surface 62C of the side wall 62. As such, the movement of the lid 32 from the closed position to the opened position moves the closure mechanism 38 from the release positon to the separated position in which the protrusion 56 is spaced apart and disengaged from the shaped groove 78 and the side wall 62 of the housing 34.

Upon movement of the lid 32 from the closed position to the opened position, the release actuator 80 is biased from the retracted position towards the extended position due to the biasing force of the biasing member 84. However, the hook 90 remains in the disengaged state as the engagement portion 104 is spaces apart from the recess 65. In order to move the lid 32 from the open state to the closed state, the user pivots the lid 32 about the pivot axis P in the direction of arrow A2 to move the lid 32 from the opened position to the closed position. Upon movement of the lid 32 from the opened position towards to the closed position, the tapered surface 108 of the engagement portion 104 of the hook 90 contacts the front wall 60 and linearly displaces the hook 90 and the release actuator 80 from the extended position towards the retracted position.

Once the lid 32 is moved into the closed position, the biasing force of the biasing member 84 biases the release actuator 80 from the retracted position to the extended position which also moves the engagement portion 104 in the direction of arrow B2 from the disengaged position to the engaged position. The movement of the engagement portion 104 from the disengaged position to the engaged position moves the locking mechanism 36 from the unlocked position to the locked position. As the lid 32 is moves from the opened position to towards the closed position, the protrusion 56 enters the release groove 122 through the first end 128 at the top surface 62C of the side wall 62 to move the closure mechanism 38 from the separated position towards the release position.

Referring to FIG. 2, the storage compartment 26 moves from the closed state to the retained state upon the vehicle 10 being involved in a rear collision. During the rear collision, a force F acting on the vehicle 10 is imparted to the housing 34 due to the connection between the housing 34 and the vehicle 10. The force F acting on the housing 34 moves the housing body 58 of the housing 34 forward in the direction of arrow B2 with respect to the lid 32. Specifically, the force F causes the housing 34 to move forward in the vehicle longitudinal direction with respect to the lid 32 due to an inertia of the lid 32. As such, the housing 34 is linearly displaced forward in the vehicle longitudinal direction (i.e. in the direction of arrow B2) with respect to the lid 32 such that the housing 34 is no longer aligned with the lid 32.

Due to the movement of the housing body 58 of the housing 34, in the direction of arrow B2, as shown in broken lines in FIG. 2, the locking mechanism 36 moves from the locked position to the unlocked position due to the movement of the engagement portion 104 from the engaged position to the disengaged position. Specifically, during the rear collision the upper surface 110 of the recess 65 of the front wall 60 moves forward in the vehicle longitudinal direction such that the upper surface 110 moves with respect to the contact surface 106 such that the contact surface 106 and the upper surface 110 are no longer in contact with each other, as shown in broken lines in FIG. 2.

Referring now to FIG. 4, the protrusion 56 shown in solid lines is within the release groove 122 when the closure mechanism 38 is in the release position. Upon the vehicle 10 being involved in the rear collision, the housing 34 moves forward in the direction of arrow B2 with respect to the lid 32. As the protrusion 56 is coupled to the lid 32, the protrusion 56 remains generally static during the rear collision due to the inertia of the lid 32; however, the shaped groove 78, which is coupled to or formed on the side wall 62 of the housing 34, moves forward in the direction of arrow B2 with respect to the protrusion 56.

During the rear collision, the movement of the housing 34 forward with respect to the lid 32 moves the shaped groove 78 such that the protrusion 56 is moved to the position shown by protrusion 56A. The protrusion 56A is positioned within the retaining groove 120 rather than the release groove 122. Specifically, the protrusion 56A is positioned at least partially between the upper side wall 140 and the bottom side wall 144 in the vehicle vertical direction.

As the housing 34 has moved forward in the direction of arrow B2, the locking mechanism 36 is moved from the locked position towards the unlocked position, and the lid 32 is no longer inhibited from moving from the closed position to the opened positon by the locking mechanism 36. However, the movement of the housing 34 forward with respect to the lid 32 moves the closure mechanism 38 from the release position to the retained position in which the protrusion 56A is within the retaining groove 120. As such, the lid 32 is inhibited from moving from the closed position to the opened position by the closure mechanism 38.

Still referring to FIG. 4, upon movement of the lid 32 about the pivot axis P in the direction of arrow A1, the protrusion 56A moves in the direction of arrow C2 into the position shown by protrusion 56B. As shown in FIG. 4, the protrusion 56B contacts the upper side wall 140 to inhibit further movement of the lid 32 about the pivot axis P in the direction of arrow A1 such that the lid 32 is inhibited from moving from the closed position towards the opened position by the contact and abutment of the protrusion 56B with the upper side wall 140 of the retaining groove 120. The contact and abutment of the protrusion 56B and the upper side wall 140 retains the protrusion 56B within the retaining groove 120 such that the lid 32 is retained from moving with respect to the housing 34 in the direction of arrow A1 by the closure mechanism 38.

Accordingly, the inertia force of the lid 32 during the rear collision of the vehicle 10 results in the closure mechanism 38 inhibiting movement of the lid 32 from the closed position to the opened position. Specifically, during the rear collision of the vehicle 10, the housing 34 is moved forward in the vehicle longitudinal direction with respect to the lid 32 such that protrusion 56 exits the release groove 122 and enters the retaining groove 120 so as to retain or inhibit the lid 32 from moving from the closed position to the opened position.

Still referring to FIG. 4, a modification of the storage compartment 26 having the closure mechanism 38 will now be discussed. In the modified storage compartment 26, the upper side wall 140 is replaced with an upper side wall 140A. The upper side wall 140A includes a generally semicircular shape that extends from the upper junction 145 to the upper end of the rear end wall 142. The semicircular shape of the upper side wall 140A extends the retaining groove 120 in the vehicle vertical direction and is configured to facilitate engagement with and retention of the protrusion 56 (56B) during the rear collision. It is appreciated, that the upper side wall 140 and the upper side wall 140A are not limited to the illustrated shapes and may include a generally triangular or rectangular shape.

Figure 5:
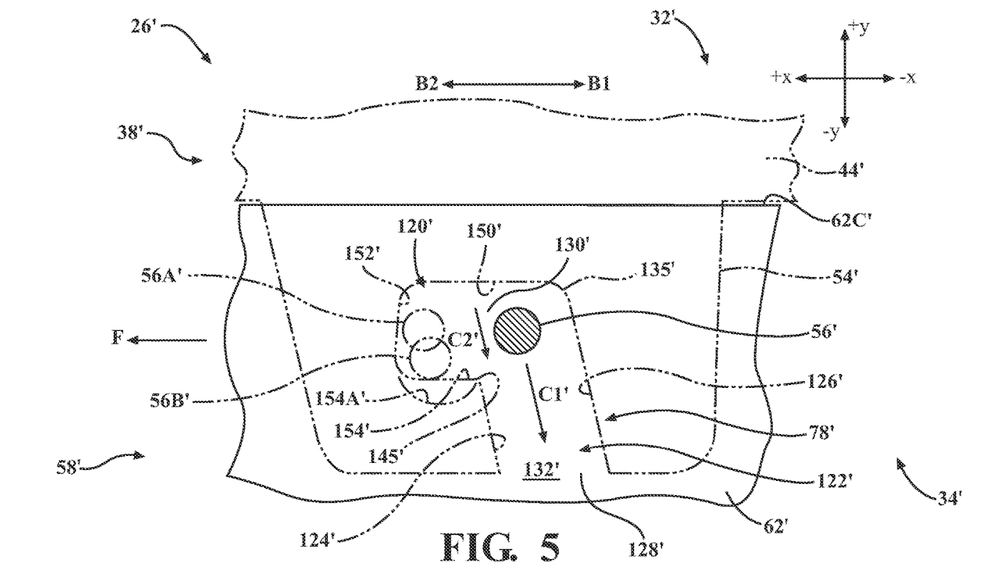
FIG. 5 schematically depicts partial side view of another closure mechanism, according to one or more embodiments described and illustrated herein.

Referring now to FIG. 5, another storage compartment is generally illustrated at 26'. The storage compartment 26' is structurally similar to the storage compartment 26 except that the closure mechanism 38' includes the shaped groove 78' that is formed on the flanges 54' of the lid 32' and the protrusion 56' is formed in the side walls 62' of the housing body 58' of the housing 34'.

The protrusions 56' extend inwardly, in the vehicle lateral direction, from each of the pair of side walls 62' of the housing body 58' of the housing 34'. The protrusion 56' is disposed on the side wall 62 below the top surface 62C'. It is appreciated that the protrusion 56' is fixedly secured to the inner surface 62A of the side walls 62 such that the protrusion 56' is not movable with respect to the side walls 62. The shaped groove 78' is formed so as to be recessed with respect to the exterior surface 54A of the flanges 54. The shaped groove 78' includes a retaining groove 120' and a release groove 122'.

The release groove 122' extends obliquely from the retaining groove 120'. Specifically, the release groove 122' extends so as to be declined in the rearward direction of the vehicle longitudinal direction as the release groove 122' extends downwardly in the vehicle vertical direction. As such, an angle formed between a longitudinal axis of the release groove 122' and a longitudinal axis of the retaining groove 120' is obtusely angled.

The release groove 122' includes a front side wall 124' and an opposite rear side wall 126'. The release groove 122' includes a first end 128' that opens to at a bottom edge of the flange 54'. The release groove 122' includes a second end 130' that corresponds to a junction between the release groove 122' and the retaining groove 120'. The front side wall 124' extends from the first end 128' at the bottom edge of the flange 54' to an upper junction 135'. The rear side wall 126' extends from the first end 128' at the bottom edge of the flange 54' to a lower junction 145'.

The retaining groove 120' extends parallel to the vehicle longitudinal direction and parallel to the direction of arrows B1 and B2. The retaining groove 120' includes an upper side wall 150', a front end wall 152', and a bottom side wall 154'. The upper side wall 150' extends from the upper junction 135' to an upper end of the front end wall 152'. The bottom side wall 154' extends from a lower end of the front end wall 152' to the lower junction 145'. The lower junction 145' is a junction between the front side wall 124' and the upper side wall 154'. The upper junction 135' is a junction between the rear side wall 126' and the bottom side wall 150'.

The storage compartment 26' operates in a similar manner as the storage compartment 26. Specifically, the protrusion 56' shown in solid lines is within the release groove 122' when the closure mechanism 38' is in the release position. The closure mechanism 38' is moved from the release position to the separated position upon movement of the lid 32' from the closed position to the opened position. Specifically, movement of the lid 32' about the pivot axis P in the direction of arrow A1 also moves the shaped groove 78' in the direction of arrow C1' so that the protrusion 56' exits the first end 128' of the release groove 122'.

Upon the vehicle 10 being involved in the rear collision, the housing 34' moves forward in the direction of arrow B2 with respect to the lid 32'. As the protrusion 56' is coupled to the housing 34', the shaped groove 78' remains generally static during the rear collision due to the inertia of the lid 32'; however, the protrusion 56', which is coupled to or formed on the side wall 62' of the housing 34', moves forward in the direction of arrow B2 with respect to the shaped groove 78'.

During the rear collision, the movement of the housing 34' forward with respect to the lid 32' moves the protrusion 56' into the position shown by protrusion 56A'. The protrusion 56A' is positioned within the retaining groove 120' rather than the release groove 122' due to the movement of the protrusion 56' with respect to the shaped groove 78'. Specifically, the protrusion 56A' is positioned at least partially between the upper side wall 150' and the bottom side wall 154' in the vehicle vertical direction.

As the housing 34' has moved forward in the direction of arrow B2, the locking mechanism 36 is moved from the locked position towards the unlocked position, and the lid 32' is no longer inhibited from moving from the closed position to the opened positon by the locking mechanism 36. However, the movement of the housing 34' forward with respect to the lid 32' moves the closure mechanism 38' from the release position to the retained position in which the protrusion 56A' is within the retaining groove 120'. As such, the lid 32' is inhibited from moving from the closed position to the opened position by the closure mechanism 38'.

Still referring to FIG. 5, upon movement of the lid 32' about the pivot axis P in the direction of arrow A1, the protrusion 56A' moves in the direction of arrow C2' into the position shown by protrusion 56B'. The protrusion 56B' contacts the bottom side wall 154' to inhibit further movement of the lid 32' about the pivot axis P in the direction of arrow A1 such that the lid 32' is inhibited from moving from the closed position towards the opened position by the contact and abutment of the protrusion 56B' with the bottom side wall 154' of the retaining groove 120'. The contact and abutment of the protrusion 56B' and the bottom side wall 154' retains the protrusion 56B' within the retaining groove 120' such that the lid 32' is retained from moving with respect to the housing 34' in the direction of arrow A1.

Accordingly, the inertia force of the lid 32' during the rear collision of the vehicle 10 results in the housing 34' moving forward in the vehicle longitudinal direction with respect to the lid 32' such that protrusion 56' exits the release groove 122' and enters the retaining groove 120' so as to retain or inhibit the lid 32' from moving from the closed position to the opened position.

Still referring to FIG. 5, a modification of the storage compartment 26' having the closure mechanism 38' will now be discussed. In the modified storage compartment 26', the bottom side wall 154' is replaced with a bottom side wall 154A'. The bottom side wall 154A' includes a generally semicircular shape that extends from the lower junction 145' to the lower end of the front end wall 152'. The semicircular shape of the bottom side wall 154A' extends the retaining groove 120' downwardly in the vehicle vertical direction and is configured to facilitate engagement with and retention of the protrusion 56' (56B') during the rear collision. It is appreciated, that the bottom side wall 154' and the bottom side wall 154A' are not limited to the illustrated shapes and may include a generally triangular or rectangular shape.

It is appreciated that the storage compartment 26 is not limited to a position between the driver seat 16 and the passenger seat 18. In some embodiments, the storage compartment 26 may be provided in other areas of the passenger compartment 12.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A storage compartment comprising:
   a housing defining a storage area;
   a lid pivotally coupled to the housing about a pivot axis for movement between a closed position and an opened position;
   a locking mechanism displaceable in a first direction for movement between an unlocked position and a locked position, the first direction extending generally normal to the pivot axis; and
   a closure mechanism configured to inhibit movement of the lid from the closed position towards the opened position upon movement of the locking mechanism to the unlocked position due to movement of the housing in the first direction with respect to the lid,
   wherein in the locked position movement of the lid from the closed position to the open position is inhibited and in the unlocked positon movement of the lid from the closed position to the open position is permitted, and
   wherein in the open position access to the storage area is permitted and in the closed position access to the storage area is inhibited.

2. The storage compartment of claim 1, wherein the closure mechanism includes a protrusion extending outwardly in a second direction from one of the lid or the housing, the second direction extending generally parallel with the pivot axis.

3. The storage compartment of claim 2, wherein the closure mechanism includes a shaped groove provided on the other of the lid or the housing.

4. The storage compartment of claim 3, wherein the protrusion extends outwardly from the lid and the shaped groove is formed on an inner surface of a side wall of the housing.

5. The storage compartment of claim 4, wherein the shaped groove includes a first groove and a second groove, the first groove extends in the first direction, and the second groove has a first end open at a top surface of the side wall of the housing and second end in communication with the first groove.

6. The storage compartment of claim 5, wherein upon movement of the lid from the closed position to the opened position the protrusion moves within the second groove to exit the first end open at the top surface of the side wall of the housing.

7. The storage compartment of claim 6, wherein upon movement of the housing with respect to the lid the protrusion moves through the second end of the second groove and into the first groove and the protrusion contacts an upper side wall of the first groove to inhibit movement of the lid from the closed position to the opened position upon movement of the locking mechanism to the unlocked position due to movement of the housing in the first direction with respect to the lid.

8. A console assembly for a vehicle, the console assembly comprising:
   a housing defining a storage area;
   a lid pivotally coupled to the housing about a pivot axis for movement between a closed position and an opened position;
   a locking mechanism displaceable in a vehicle longitudinal direction to move between an unlocked position and a locked position, the vehicle longitudinal direction extending generally normal to the pivot axis; and
   a closure mechanism configured to inhibit movement of the lid from the closed position towards the opened position upon movement of the locking mechanism to the unlocked position due to movement of the housing in a first direction with respect to the lid, the first direction extending parallel with the vehicle longitudinal direction,
   wherein in the locked position movement of the lid from the closed position to the open position is inhibited and in the unlocked positon movement of the lid from the closed position to the open position is permitted, and
   wherein in the open position access to the storage area is permitted and in the closed position access to the storage area is inhibited.

9. The console assembly of claim 8, wherein the closure mechanism includes a protrusion extending outwardly in a second direction from one of the lid or the housing, the second direction extending generally parallel with the pivot axis.

10. The console assembly of claim 9, wherein the closure mechanism includes a shaped groove provided on the other of the lid or the housing.

11. The console assembly of claim 10, wherein the protrusion extends outwardly from the lid and the shaped groove is formed on an inner surface of a side wall of the housing.

12. The console assembly of claim 11, wherein the shaped groove includes a first groove and a second groove, the first groove extends in the vehicle longitudinal direction, and the second groove has a first end open at a top surface of the side wall of the housing and second end in communication with the first groove.

13. The console assembly of claim 12, wherein upon movement of the lid from the closed position to the opened position the protrusion moves within the second groove to exit the first end open at the top surface of the side wall of the housing.

14. The console assembly of claim 13, wherein upon movement of the housing with respect to the lid the protrusion moves through the second end of the second groove and into the first groove and the protrusion contacts an upper side wall of the first groove to inhibit movement of the lid from the closed position to the opened position upon movement of the locking mechanism to the unlocked position due to movement of the housing in the first direction with respect to the lid.

15. A vehicle comprising:
   a passenger compartment;
   a storage compartment provided in the passenger compartment, the storage compartment comprising:
      a housing defining a storage area;
      a lid pivotally coupled to the housing about a pivot axis for movement between a closed position and an opened position;
      a locking mechanism displaceable in a vehicle longitudinal direction to move between an unlocked position and a locked position, the vehicle longitudinal direction extending generally normal to the pivot axis; and
      a closure mechanism configured to inhibit movement of the lid from the closed position towards the opened position upon movement of the locking mechanism to the unlocked position due to movement of the housing in a first direction with respect to the lid, the first direction extending parallel with the vehicle longitudinal direction,
      wherein in the locked position movement of the lid from the closed position to the open position is inhibited and in the unlocked positon movement of the lid from the closed position to the open position is permitted, and
      wherein in the open position access to the storage area is permitted and in the closed position access to the storage area is inhibited.

16. The vehicle of claim 15, wherein the closure mechanism includes a protrusion and a shaped groove, the protrusion extends outwardly in a second direction from one of the lid or the housing, the second direction extending generally parallel with the pivot axis, the shaped is provided on the other of the lid or the housing.

17. The vehicle of claim 16, wherein the protrusion extends outwardly from the lid and the shaped groove is formed on an inner surface of a side wall of the housing.

18. The vehicle of claim 17, wherein the shaped groove includes a first groove and a second groove, the first groove extends in the vehicle longitudinal direction, and the second groove has a first end open at a top surface of the side wall of the housing and second end in communication with the first groove.

19. The vehicle of claim 18, wherein upon movement of the lid from the closed position to the opened position the protrusion moves within the second groove to exit the first end open at the top surface of the side wall of the housing.

20. The vehicle of claim 19, wherein upon movement of the housing with respect to the lid the protrusion moves through the second end of the second groove and into the first groove and the protrusion contacts an upper side wall of the first groove to inhibit movement of the lid from the closed position to the opened position upon movement of the locking mechanism to the unlocked position due to movement of the housing in the first direction with respect to the lid.

* * * * *